(12) United States Patent
Nakayama et al.

(10) Patent No.: US 11,310,382 B2
(45) Date of Patent: Apr. 19, 2022

(54) IMAGE READING DEVICE, MEDIUM CONVEYANCE DEVICE, AND IMAGE FORMING APPARATUS

(71) Applicant: Ricoh Company, Ltd., Tokyo (JP)

(72) Inventors: Satoshi Nakayama, Kanagawa (JP); Susumu Mikajiri, Tokyo (JP); Kimiharu Yamazaki, Kanagawa (JP); Tohru Matsumoto, Kanagawa (JP); Kohta Aoyagi, Kanagawa (JP); Hideyo Makino, Tokyo (JP); Ryosuke Ebinuma, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/178,411

(22) Filed: Feb. 18, 2021

(65) Prior Publication Data

US 2021/0297543 A1    Sep. 23, 2021

(30) Foreign Application Priority Data

Mar. 17, 2020   (JP) .............................. JP2020-046387

(51) Int. Cl.
*H04N 1/04*      (2006.01)
*H04N 1/00*      (2006.01)

(52) U.S. Cl.
CPC ..... *H04N 1/00724* (2013.01); *H04N 1/00726* (2013.01); *H04N 1/00737* (2013.01)

(58) Field of Classification Search
CPC .......... H04N 1/00724; H04N 1/00726; H04N 1/00737; H04N 1/3878; H04N 1/00588

USPC ......................................... 358/1.1–1.18, 474
See application file for complete search history.

(56) References Cited

U.S. PATENT DOCUMENTS

| | | | |
|---|---|---|---|
| 2016/0221780 | A1 | 8/2016 | Nishimura et al. |
| 2017/0010576 | A1 | 1/2017 | Takagi et al. |
| 2017/0034392 | A1 | 2/2017 | Suga et al. |
| 2017/0097601 | A1 | 4/2017 | Takenaga et al. |

(Continued)

FOREIGN PATENT DOCUMENTS

| | | |
|---|---|---|
| JP | 9-270884 | 10/1997 |
| JP | 2003-219107 | 7/2003 |

(Continued)

*Primary Examiner* — Gabriel I Garcia
(74) *Attorney, Agent, or Firm* — Xsensus LLP

(57) ABSTRACT

An image reading device includes a transparent member unit including a transparent member, an opposing member opposed to the transparent member, and a reading mechanism. The reading mechanism irradiates the opposing member and a medium being conveyed between the transparent member and the opposing member with light through the transparent member and receive reflected light from the opposing member and the medium. The reading mechanism includes a position adjuster to which the transparent member unit is secured and a guide to guide the transparent member unit in a direction intersecting a direction of conveyance of the medium to detachably attach the transparent member unit to the reading mechanism. The position adjuster changes a position at which the transparent member unit is secured with respect to the reading mechanism. The transparent member unit is secured to the position adjuster.

8 Claims, 10 Drawing Sheets

(56) References Cited

U.S. PATENT DOCUMENTS

| | | |
|---|---|---|
| 2017/0131671 A1 | 5/2017 | Nishimura et al. |
| 2017/0153591 A1 | 6/2017 | Nakura et al. |
| 2017/0176908 A1 | 6/2017 | Kobayashi et al. |
| 2017/0357200 A1 | 12/2017 | Takagi et al. |
| 2018/0020108 A1 | 1/2018 | Nakayama et al. |
| 2018/0103171 A1* | 4/2018 | Fukushima .......... H04N 1/1235 |
| 2018/0141329 A1 | 5/2018 | Aoyagi et al. |
| 2018/0141359 A1 | 5/2018 | Kawarada et al. |
| 2018/0147835 A1 | 5/2018 | Nakamura et al. |
| 2018/0194581 A1 | 7/2018 | Matsumoto |
| 2018/0364627 A1 | 12/2018 | Kobayashi et al. |
| 2019/0163112 A1 | 5/2019 | Nikaku et al. |
| 2019/0166271 A1 | 5/2019 | Yamazaki et al. |
| 2019/0171137 A1 | 6/2019 | Kobayashi |
| 2019/0202648 A1 | 7/2019 | Nakayama et al. |
| 2019/0281182 A1* | 9/2019 | Kanaya .............. G06K 9/00456 |
| 2020/0004187 A1 | 1/2020 | Takagi et al. |
| 2020/0036855 A1* | 1/2020 | Nakamura ......... H04N 1/00615 |
| 2020/0137262 A1* | 4/2020 | Kubo ................. H04N 1/00737 |
| 2020/0296243 A1 | 9/2020 | Aoyagi et al. |
| 2020/0301326 A1 | 9/2020 | Yamazaki et al. |

FOREIGN PATENT DOCUMENTS

| | | |
|---|---|---|
| JP | 2014-003385 | 1/2014 |
| JP | 2018-011154 | 1/2018 |
| JP | 2019-101326 | 6/2019 |

\* cited by examiner

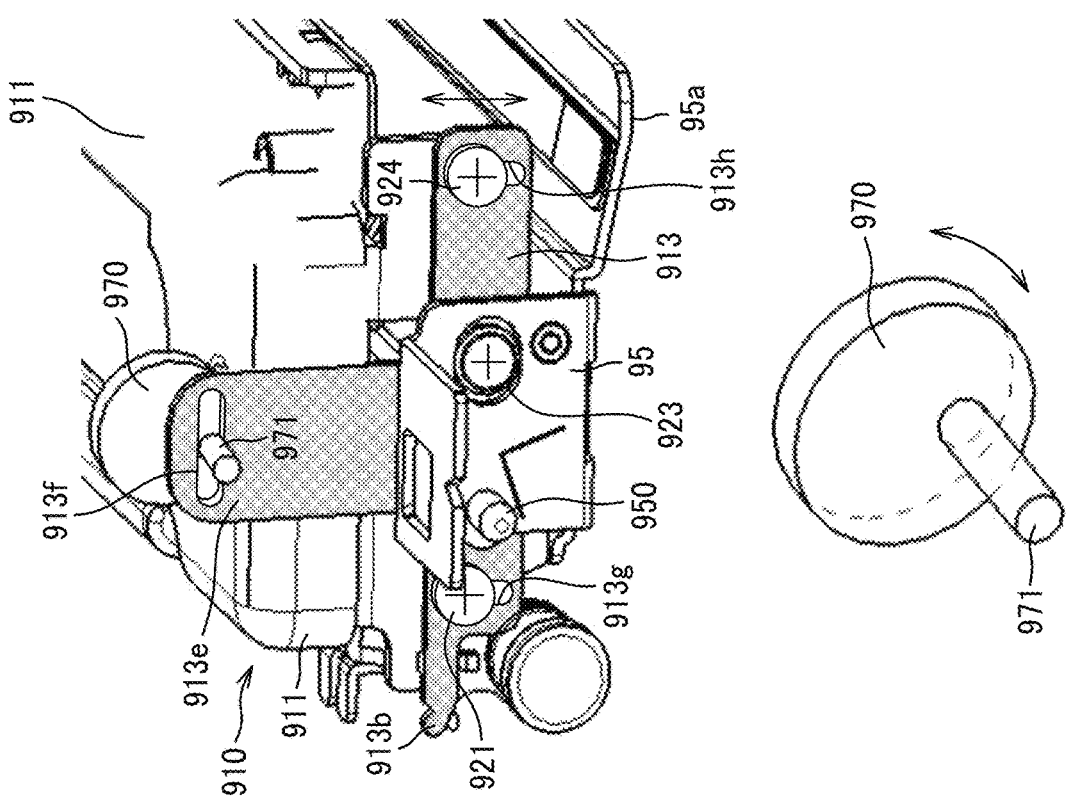
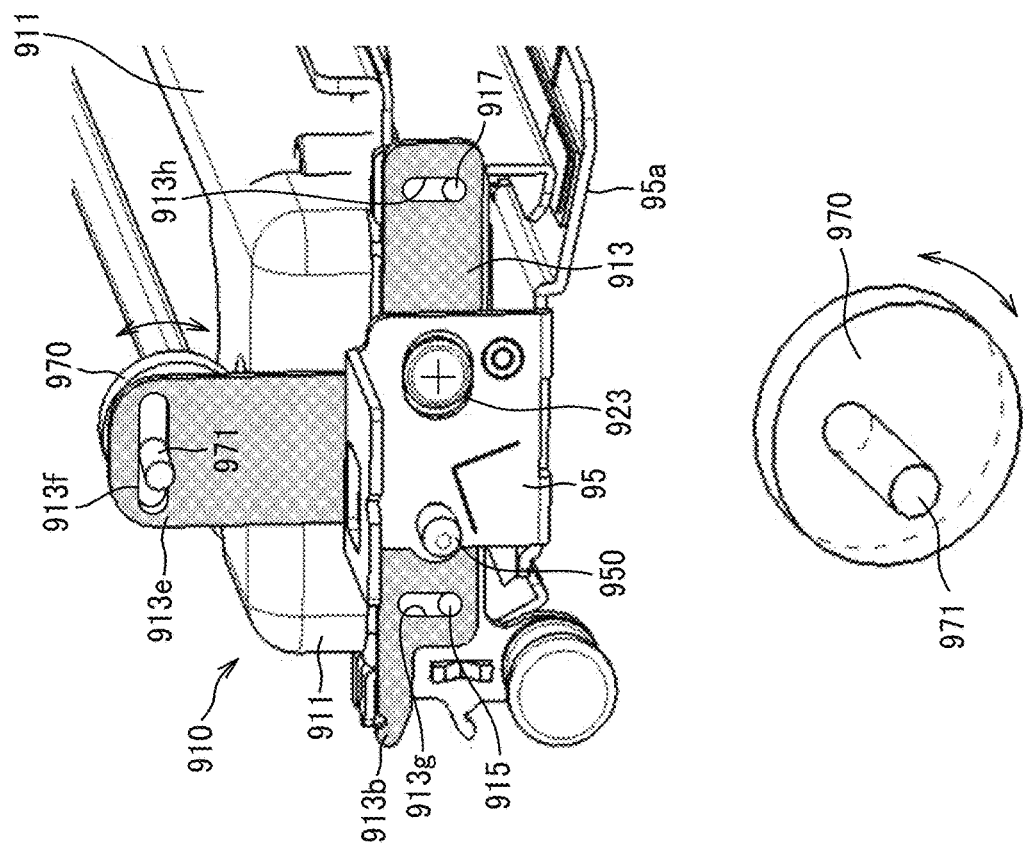

IMAGE READING DEVICE, MEDIUM CONVEYANCE DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2020-046387, filed on Mar. 17, 2020, in the Japan Patent Office, the entire disclosure of which is hereby incorporated by reference herein.

BACKGROUND

Technical Field

Embodiments of the present disclosure relate to an image reading device, a medium conveyance device including the image reading device, and an image forming apparatus, such as a copier, a printer, a facsimile machine, a plotter, or a multifunction peripheral (MFP) having at least two of such capabilities, including the medium conveyance device. The image reading device reads an image on a medium being conveyed after the image is formed on the medium.

Description of the Related Art

There is known an image reading device that includes a reading mechanism. The reading mechanism irradiates a reference surface with light and reads the reflected light from the reference surface through a transparent member. Further, when a medium on which an image has been formed is conveyed between the reference surface and the transparent member, the reading mechanism irradiates the image with light and reads the reflected light from the image through the transparent member.

SUMMARY

Embodiments of the present disclosure describe an improved image reading device that includes a transparent member unit including a transparent member, an opposing member opposed to the transparent member, and a reading mechanism. The reading mechanism irradiates the opposing member and a medium being conveyed between the transparent member and the opposing member with light through the transparent member and receive reflected light from the opposing member and the medium. The reading mechanism includes a position adjuster to which the transparent member unit is secured and a guide to guide the transparent member unit in a direction intersecting a direction of conveyance of the medium to detachably attach the transparent member unit to the reading mechanism. The position adjuster changes a position at which the transparent member unit is secured with respect to the reading mechanism. The transparent member unit is secured to the position adjuster.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4Ab is a plan view of one end of the illumination unit;

FIG. 4Ac is a perspective view of the other end of the illumination unit;

FIG. 4Ad is a plan view of the one end of the illumination unit when a transparent member unit is detached from the illumination unit;

FIG. 4Cb is a plan view of the transparent member unit detached from the illumination unit;

FIG. 4Db is a perspective view of the position adjuster when the transparent member unit is attached;

FIG. 7A is a perspective view of the position adjuster when the transparent member unit is separated from the opposing member disposed below the transparent member unit according to another embodiment of the present disclosure; and FIG. 7B is a perspective view of the position adjuster when the transparent member unit approaches the opposing member.

Figure 1:
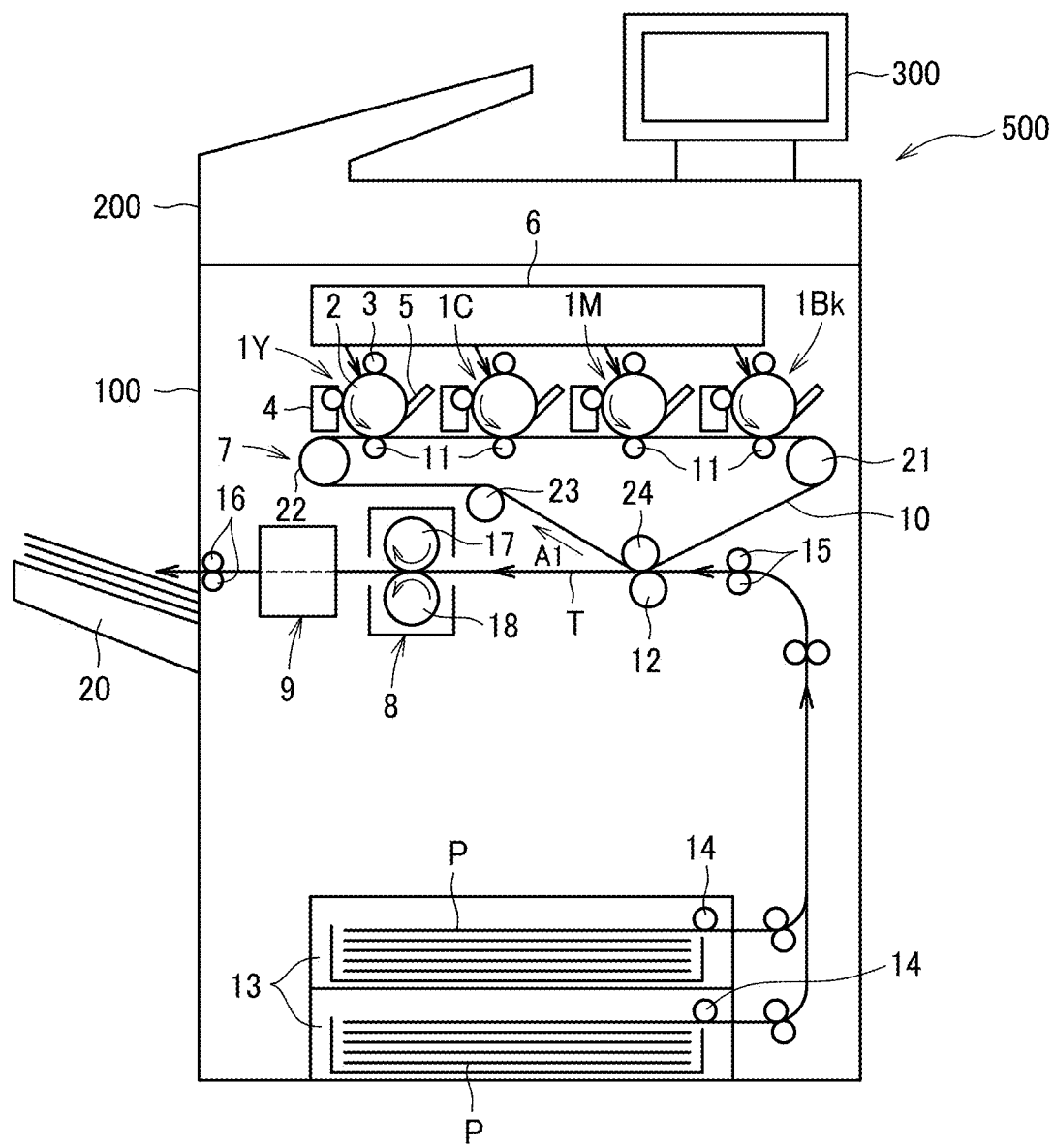
FIG. 1 is a schematic side view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and Bk attached to each reference numeral indicate only that components indicated thereby are used for forming yellow, magenta, cyan, and black images, respectively, and hereinafter may be omitted when color discrimination is not necessary or when the components are collectively referred to.

Figure 2:
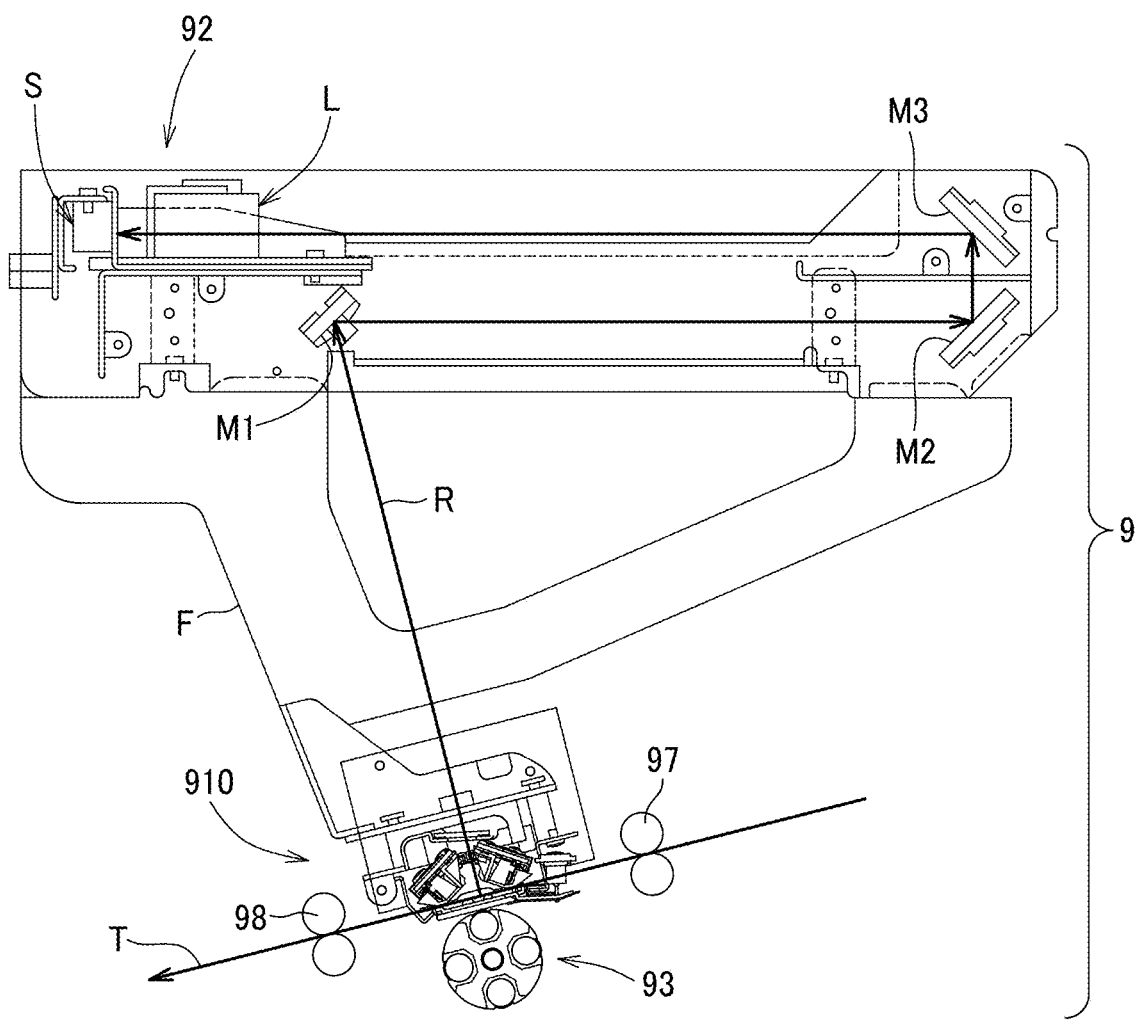
FIG. 2 is a schematic side view of an image reading device according to an embodiment of the present disclosure.

Hereinafter, an embodiment of the present disclosure is described with reference to the drawings. A color multifunction peripheral (MFP) 500 as an electrophotographic image forming apparatus includes an image reading device 9. The image reading device 9 reads an image on a recording medium such as a paper sheet after the image is fixed on the recording medium. FIG. 1 is a schematic view illustrating the configuration of the MFP 500 as the image forming apparatus according to the present embodiment. FIG. 2 is a schematic side view of the image reading device 9.

The configuration and operation of the MFP 500 are described. As illustrated in FIG. 1, the MFP 500 mainly includes an apparatus body 100 of the image forming apparatus, a scanner 200, and a control panel 300. The scanner 200 is attached to the upper portion of the apparatus body 100 to read a document. The control panel 300 projecting upward is mounted behind the scanner 200.

The scanner 200 includes a first moving unit including a light source for document and at least one mirror, and a second moving unit including multiple reflection mirrors. While the first moving unit and the second moving unit reciprocally move, the scanner 200 scans an image of the document placed on a platen that contacts the lower surface of the scanner 200. Scanning light transmitted from the second moving unit is focused, by an imaging lens, on an image forming surface of a reading sensor disposed behind the imaging lens. Then, the reading sensor reads the focused light as an image signal.

The control panel 300 includes a speaker and a liquid crystal panel including a pressure sensitive touch panel. A controller causes the control panel 300 to display an operation screen or a setting screen and receives data selected (input) on each screen from the control panel 300. In addition, the controller causes the control panel 300 to display various messages and information such as an operation status of each unit, instructions that prompt a user to supply media P and to supply toner, a warning, and the like on the liquid crystal panel, or causes the control panel 300 to output a sound from the speaker.

As illustrated in FIG. 1, the apparatus body 100 includes a tandem type image forming device including four process units 1Y, 1C, 1M, and 1Bk as image forming units arranged in parallel. The process units 1Y, 1C, 1M, and 1Bk are removably installable in the apparatus body 100 and have the same configuration except for containing different color toners, i.e., yellow (Y), magenta (M), cyan (C), or black (Bk) toners, respectively, corresponding to decomposed color components of full-color images.

Specifically, each of the process units 1Y, 1C, 1M, and 1Bk includes a drum-shaped photoconductor 2 as an electrostatic latent image bearer, a charging roller 3 as a charging device to charge the surface of the photoconductor 2, a developing device 4 to form a toner image on the surface of the photoconductor 2. The process unit 1 further includes a cleaning blade 5 as a cleaning device to clean the surface of the photoconductor 2. In FIG. 1, reference numerals of the photoconductor 2, the charging roller 3, the developing device 4, and the cleaning blade 5 are indicated in the process unit 1Y but are omitted in the process units 1C, 1M, and 1Bk for simplicity.

An exposure device 6 to expose the surface of the photoconductors 2 is disposed above the process units 1Y, 1C, 1M, and 1Bk. The exposure device 6 includes a light source, a polygon mirror, an f-θ lens, and reflection mirrors to irradiate the surfaces of the photoconductors 2 with laser beams according to the image data. The image data is input from the scanner 200 or an external device such as a personal computer.

A transfer device 7 is disposed below the process units 1Y, 1C, 1M, and 1Bk. The transfer device 7 includes an intermediate transfer belt 10 that is an endless belt as a transfer body. The intermediate transfer belt 10 is stretched around multiple stretch rollers 21, 22, 23, and 24. When one of the multiple stretch rollers 21, 22, 23, and 24 rotates as a drive roller, the intermediate transfer belt 10 rotates in the direction indicated by arrow A1 illustrated in FIG. 1.

Four primary transfer rollers 11 as primary transferors are disposed opposite the four photoconductors 2, respectively. At the position opposite the corresponding photoconductor 2, each of the primary transfer rollers 11 presses the inner circumferential surface of the intermediate transfer belt 10 against the corresponding photoconductor 2 to form a primary transfer nip where a pressed portion of the intermediate transfer belt 10 contacts the photoconductor 2. The primary transfer rollers 11 are electrically connected to a power source, and a predetermined voltage that is either direct current (DC) voltage, alternating current (AC) voltage, or including both is applied to the primary transfer rollers 11.

A secondary transfer roller 12 as a secondary transferor is disposed opposite the stretch roller 24, which is one of the multiple stretch rollers 21, 22, 23, and 24 around which the intermediate transfer belt 10 is looped. The secondary transfer roller 12 presses the outer circumferential surface of the intermediate transfer belt 10 against the stretch roller 24 to form a secondary transfer nip where the secondary transfer roller 12 contacts the intermediate transfer belt 10. Similarly to the primary transfer rollers 11, the secondary transfer roller 12 is electrically connected to a power source, and a predetermined voltage that is either DC voltage, AC voltage, or including both is applied to the secondary transfer roller 12.

A plurality of sheet feeding trays 13 as a sheet feeder is disposed at the lower portion of the apparatus body 100 to accommodate media P as sheet-shaped objects, such as paper sheets, overhead projector (OHP) transparencies, and the like. A sheet feeding roller 14 is provided in each sheet feeding tray 13 to feed the media P accommodated in the sheet feeding tray 13. A sheet ejection tray 20 is disposed on the left outer surface of the apparatus body 100 in FIG. 1. The media P ejected from the apparatus body 100 are stacked on the sheet ejection tray 20.

A medium conveyance path T is arranged inside the apparatus body 100, and the medium P is conveyed from the sheet feeding tray 13 to the sheet ejection tray 20 via the secondary transfer nip along the medium conveyance path T. In the medium conveyance path T, a registration roller pair 15 is disposed upstream from the secondary transfer roller 12 in a direction of conveyance of the medium P (hereinafter referred to as a medium conveyance direction). A fixing device 8, the image reading device 9, and a sheet ejection roller pair 16 are disposed downstream from the secondary transfer roller 12 in the medium conveyance direction in order.

The fixing device 8 includes, for example, a fixing roller 17 including a heater therein and a pressure roller 18 that presses the fixing roller 17. The portion where the fixing roller 17 and the pressure roller 18 contact each other is referred to as a fixing nip.

The controller includes a central processing unit (CPU), a random access memory (RAM), a read only memory (ROM), a non-volatile memory, and a driver for each unit. The controller loads a program stored in the ROM or the non-volatile memory into the RAM, performs calculation based on data from an external device, a detection result of each sensor, and input data from the control panel 300, and communicates with a control unit of each unit and each device to perform control thereof.

A basic operation when the MFP 500 serves as a copier is described below. When a document is placed on the platen of the scanner 200 and a copy button (start button) of the control panel 300 is pressed, the scanner 200 starts reading the document. At the same time, the photoconductor 2 of each of the process units 1Y, 1C, 1M, and 1Bk rotates counterclockwise in FIG. 1, and the charging roller 3 uniformly charges the surface of the photoconductor 2 in a predetermined polarity.

Then, the exposure device 6 irradiates the charged surfaces of the respective photoconductors 2 with laser beams based on image data of the document read by the scanner 200. Thus, electrostatic latent images are formed on the surfaces of the respective photoconductors 2. At this time, the image data for exposing the photoconductor 2 is single-color image data obtained by decomposing a desired full-color image into individual color components, that is, yellow, cyan, magenta, and black components. The electrostatic latent image formed on the photoconductor 2 is developed into a toner image (visible image) with toner deposited by the developing device 4.

The intermediate transfer belt 10 rotates in the direction indicated by arrow A1 illustrated in FIG. 1 as one of the multiple stretch rollers 21, 22, 23, and 24 rotates, around which the intermediate transfer belt 10 is looped. A power supply applies a constant voltage or a voltage controlled at a constant current, which has a polarity opposite a polarity of the charged toner, to the primary transfer rollers 11. As a result, transfer electric fields are generated at the respective primary transfer nips between the primary transfer rollers 11 and the photoconductors 2.

The transfer electric fields generated at the primary transfer nips sequentially transfer and superimpose the respective toner images from the photoconductors 2 onto the intermediate transfer belt 10. Thus, a full-color toner image, which is the superimposed toner images, is formed on the surface of the intermediate transfer belt 10. Residual toner remaining on the photoconductor 2 failed to be transferred onto the intermediate transfer belt 10 is removed by the cleaning blade 5.

As the sheet feeding roller 14 rotates, a medium P is fed out from the sheet feeding tray 13. The registration roller pair 15 forwards the medium P fed from the sheet feeding tray 13 to the secondary transfer nip between the secondary transfer roller 12 and the intermediate transfer belt 10 at appropriate timing.

At that time, a secondary transfer voltage opposite in polarity to the toner images on the intermediate transfer belt 10 is applied to the secondary transfer roller 12, and a transfer electric field is generated in the secondary transfer nip. The transfer electric field generated in the secondary transfer nip collectively transfers the toner images from the intermediate transfer belt 10 onto the medium P.

The medium P bearing the full-color toner image is then conveyed to the fixing device 8. The fixing roller 17 and the pressure roller 18 apply heat and pressure to the medium P to fix the full-color toner image on the medium P. The image reading device 9 reads the full-color toner image formed on the medium P, and the sheet ejection roller pair 16 ejects the medium P onto the sheet ejection tray 20. Residual toner remaining on the intermediate transfer belt 10 downstream from the secondary transfer nip is removed by a belt cleaning device disposed opposite the stretch roller 22 via the intermediate transfer belt 10 in preparation for the next image formation (printing).

The above description concerns the image forming operation to form a full-color toner image on the medium P. Alternatively, the MFP 500 according to the present embodiment may form a monochrome toner image by using any one of the four process units 1Y, 1C, 1M, and 1Bk, or may form a bicolor toner image or a tricolor toner image by using two or three of the process units 1Y, 1C, 1M, and 1Bk.

As illustrated in FIGS. 1 to 3B, the image reading device 9 according to the embodiment of the present disclosure is disposed in the medium conveyance path T between the fixing device 8 and the sheet ejection roller pair 16. Conveyance roller pairs 97 and 98 are disposed upstream and downstream from the image reading device 9 in the medium conveyance direction to convey the medium P. That is, the image reading device 9 and the conveyance roller pairs 97 and 98 construct a medium conveyance device.

As illustrated in FIG. 2, an illumination unit 910 is disposed directly above the medium conveyance path T. A reading mechanism 92 includes the illumination unit 910 coupled to the reading mechanism 92 by a frame F.

The illumination unit 910 includes a pair of illumination members 91. The pair of illumination members 91 are respectively disposed on both sides of arrow R and opposite an opposing member 93 via the medium conveyance path T. The opposing member 93 serves as a conveyance guide on one side of the medium conveyance path T as described later, and has a function as a white reference surface serving as a reference for image correction of the image on the medium P.

The reading mechanism 92 includes three reflection mirrors M1 to M3, an imaging lens L, and an image sensor S. The three reflection mirrors M1 to M3 guide the reflected light from an image forming surface of the medium P passing through the reading position in the medium conveyance path T and the reflected light from the opposing member 93 to the imaging lens L. The imaging lens L focuses the reflected light on the image sensor S to form an image.

The image sensor S includes an imaging element and reads an image formed on the image forming surface of the medium P. Further, the image sensor S reads a reference face of a conveyance roller 93a (see FIGS. 3A and 3B) of the opposing member 93 when the medium P is not present at the reading position. The image sensor S receives the light focused by the imaging lens L and generates image data corresponding to the amount of received light.

Figure 3A:
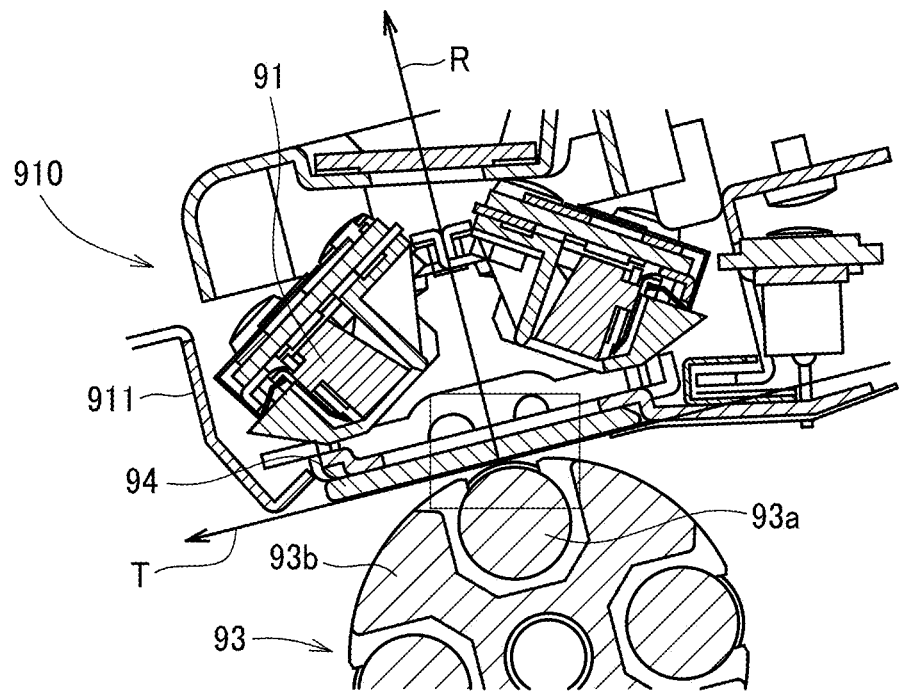
FIG. 3A is a cross-sectional view of an illumination unit and an opposing member of the image reading device.
Figure 3B:
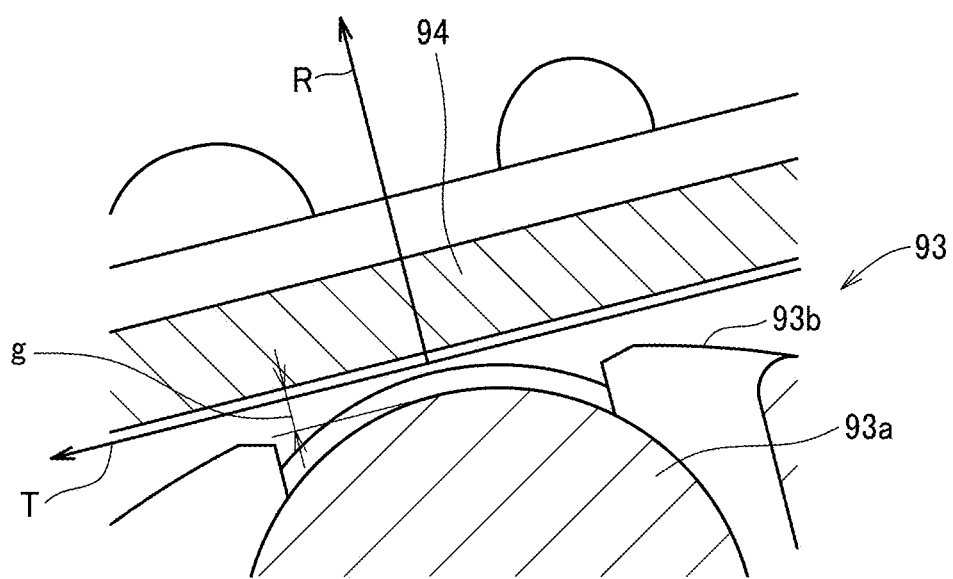
FIG. 3B is an enlarged cross-sectional view of the illumination unit and the opposing member.

FIG. 3A is a cross-sectional view of the illumination unit 910 and the opposing member 93, and FIG. 3B is an enlarged cross-sectional view thereof. The opposing member 93 is opposed to the illumination members 91 across the medium conveyance path T and serves as a revolver including a plurality of conveyance rollers 93a (four conveyance rollers 93a in the present embodiment). The conveyance rollers 93a are rotatably supported by a roller holder 93b.

The roller holder 93b rotates around the center shaft of the revolver at the intervals of 90 degrees to switch the four conveyance rollers 93a.

Each of the four conveyance rollers 93a rotates independently of the roller holder 93b. When one of the conveyance roller 93a is opposed to a transparent member 94, the reading position of the reading mechanism 92 is set at a position closest to the transparent member 94 on the outer circumferential surface of the conveyance roller 93a. The transparent member 94 serves as a platen to read an image on a medium P passing through the reading position. The reading position may be set, for example, at a position closer to the transparent member 94 by the thickness of the medium P from the position closest to the transparent member 94 on the outer circumferential surface of the conveyance roller 93a opposed to the transparent member 94.

When the medium P is conveyed to the reading position, the transparent member 94 faces the image forming surface of the medium P. When the medium P passes through the reading position in the state illustrated in FIG. 3A, the reading mechanism 92 reads the image forming surface of the medium P through the transparent member 94 as indicated by arrow R.

A conveyance gap g is formed between the outer circumferential surface of the conveyance roller 93a and the transparent member 94. The conveyance gap g is greater than the thickness of the medium P being conveyed. The conveyance roller 93a is rotated together with the medium P passing through the reading position to smoothly convey the medium P. Thus, since the conveyance roller 93a has a function of conveying the medium P, the medium P is not jammed even if the conveyance gap g is narrow enough to prevent the medium P from fluttering.

The four conveyance rollers 93a have different colors and/or diameters. For example, the first conveyance roller 93a is black and has a normal diameter, the second conveyance roller 93a is white and has a small diameter, the third conveyance roller 93a is white and has the normal diameter, and the fourth conveyance roller 93a is black and has the small diameter. The color of the conveyance roller 93a may be switched depending on modes for conveying the medium P, and the diameter of the conveyance roller 93a may be switched depending on the thickness of the medium P or whether the conveyance roller 93a is used during shading operation.

A driver that rotates the four conveyance rollers 93a may be provided. In this case, even if the conveyance gap g between the transparent member 94 and one of the four conveyance rollers 93a opposed to the transparent member 94 is further narrowed, the medium P can be conveyed.

As illustrated in FIGS. 3A and 3B, the transparent member 94 is disposed between the illumination members 91 and the conveyance roller 93a. The transparent member 94 has an elongated plate-shape extending in the width direction of the medium conveyance path T, that is, the longitudinal direction of the transparent member 94 is perpendicular to the medium conveyance direction in the medium conveyance path T.

The transparent member 94 serves as the conveyance guide on the other side of the medium conveyance path T, and forms the image reading surface by the reading mechanism 92. As described above, the opposing member 93 serves as the conveyance guide on the one side of the medium conveyance path T. Note that "perpendicular" to the medium conveyance direction does not strictly mean an angle of 90 degrees. The same applies to "perpendicular" used in descriptions below.

A space between the transparent member 94 and the conveyance roller 93a is the conveyance gap g of the image reading surface illustrated in FIG. 3B. As the conveyance gap g is accurately adjusted, the medium P is prevented from fluttering, and the surface of the medium P is less likely to be out of the focus of the reading mechanism 92, thereby reading the image reading surface of the medium P accurately.

The size of the conveyance gap g is likely to vary at the time of assembly due to the tolerance accumulation of components up to the conveyance roller 93a and the transparent member 94. Here, for example, if the large diameter portion of the conveyance roller 93a contacts the transparent member 94, the conveyance gap g can be prevented from varying. However, if the conveyance gap g is adjusted while the conveyance roller 93a is pressed against the transparent member 94, the portion of the conveyance roller 93a pressed against the transparent member 94 may be worn, causing the size of the conveyance gap g to vary over time.

Since the transparent member 94 becomes dirty, over time, with paper dust, toner, or the like scattered from the medium T being conveyed, the transparent member 94 is required to be cleaned. However, since the conveyance gap g between the transparent member 94 and the conveyance roller 93a is narrow, it is difficult to insert a cleaner into the conveyance gap g to clean the transparent member 94.

In addition, since the conveyance gap g is narrow, it is difficult to attach and detach the transparent member 94 in the direction of thickness of the medium P to be conveyed. Furthermore, it is also difficult to attach the transparent member 94 after cleaning while adjusting the position of the transparent member 94 so as to maintain the conveyance gap g.

Therefore, in the present embodiment, with the configuration described below, the transparent member 94 is detachably attachable, and the conveyance gap g can be maintained without taking time and effort for adjusting the position of the transparent member 94 when the transparent member 94 is reattached. Since the conveyance gap g does not change before and after the detachment of the transparent member 94, the optical path length from the illumination member 91 to the medium P and the optical path length from the medium P to the image sensor S that receives the reflected light from the medium P do not change, thereby preventing the reading accuracy from deteriorating.

Figure 4A:
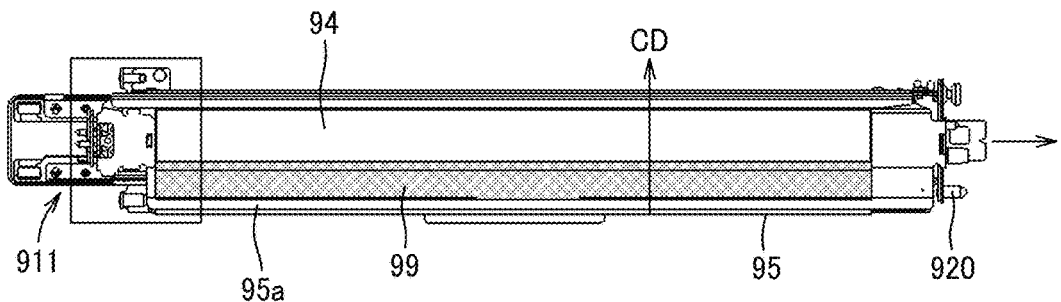
FIG. 4Aa is a plan view of the illumination unit of the image reading device.
Figure 4A:
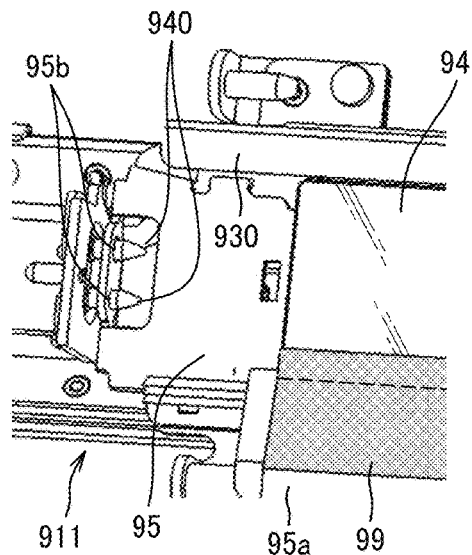
Figure 4A:
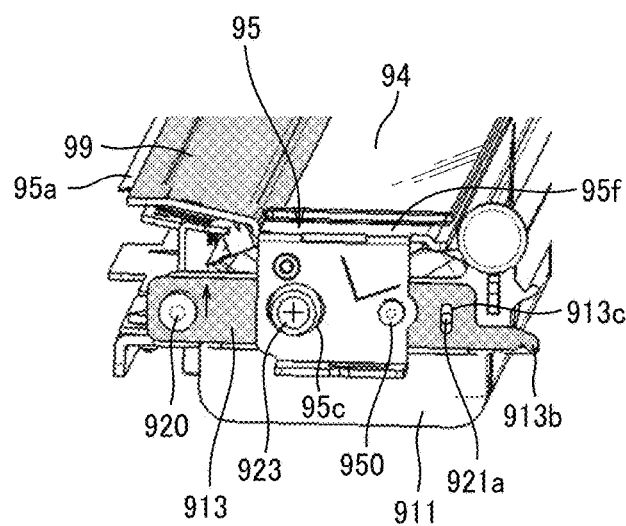
Figure 4A:
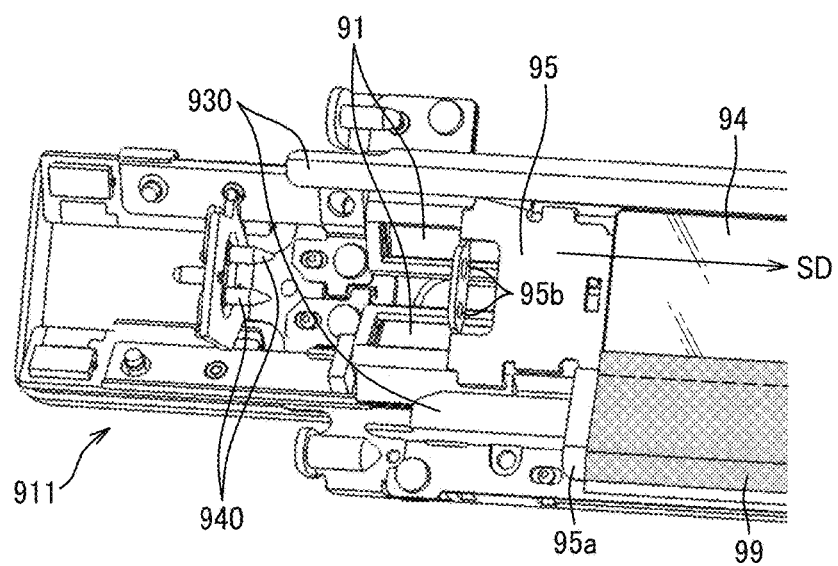

As illustrated in FIGS. 4Aa to 4Cb, the transparent member 94 is held by a transparent member holder 95. The transparent member holder 95 together with the transparent member 94 as a transparent member unit is attached to a housing 911 of the illumination unit 910.

Figure 4B:
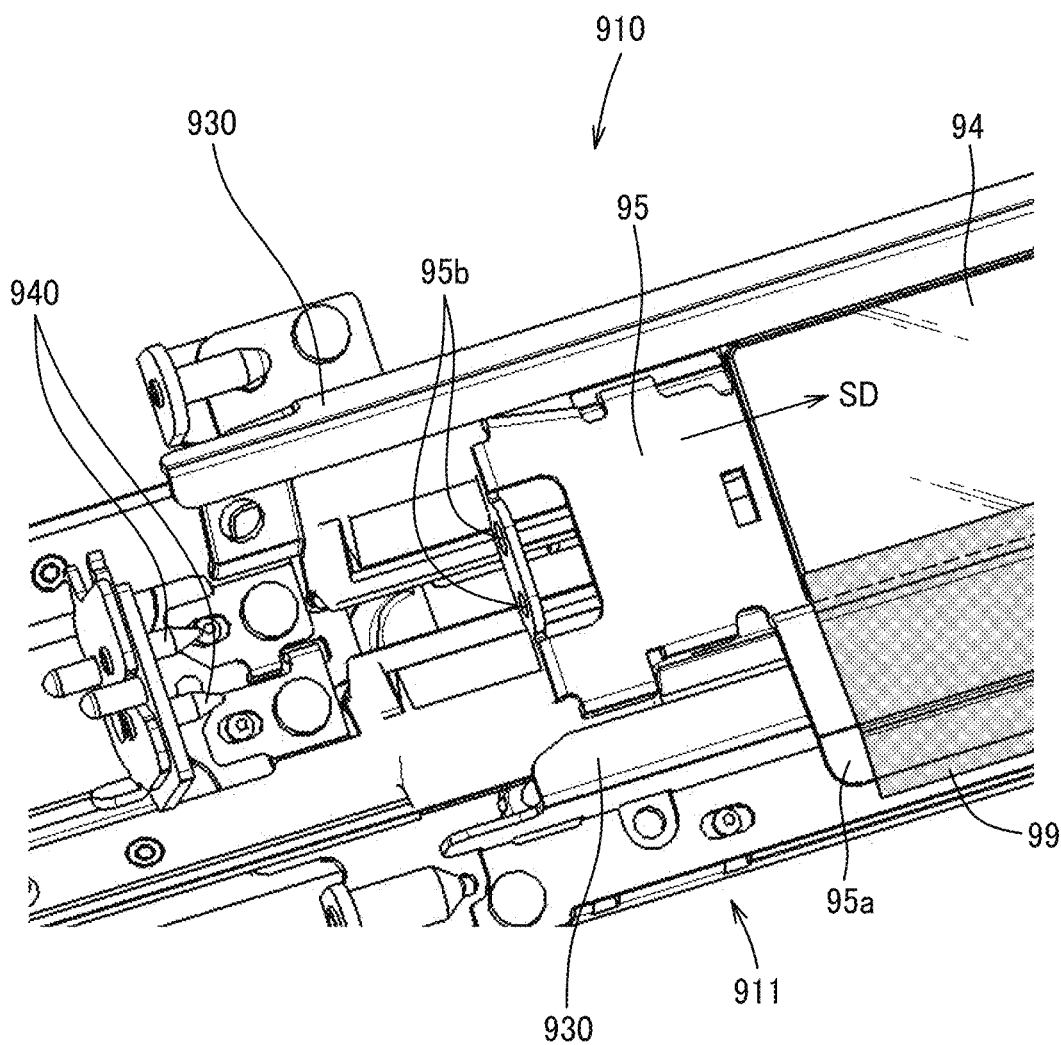
FIG. 4B is a plan view of the one end of the illumination unit illustrated in FIG. 4Ad as viewed in another direction.
Figure 4C:
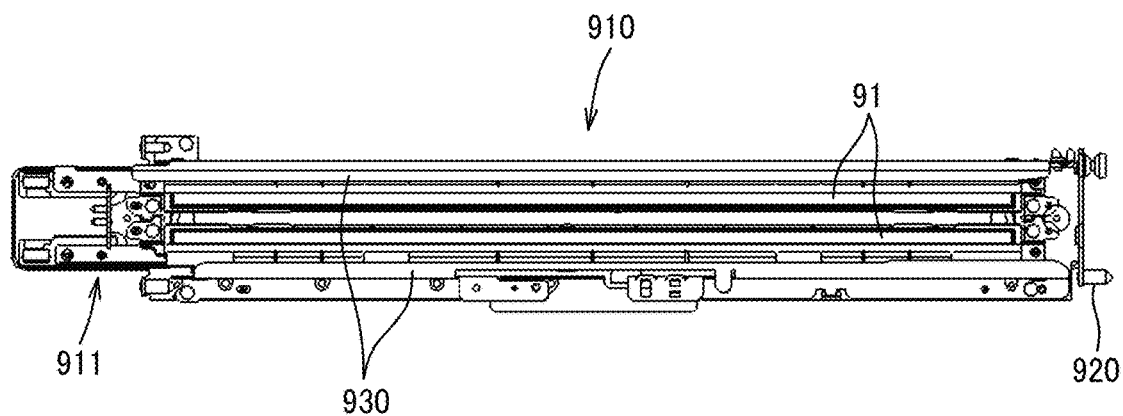
FIG. 4Ca is a plan view of the illumination unit when the transparent member unit is detached.
Figure 4C:
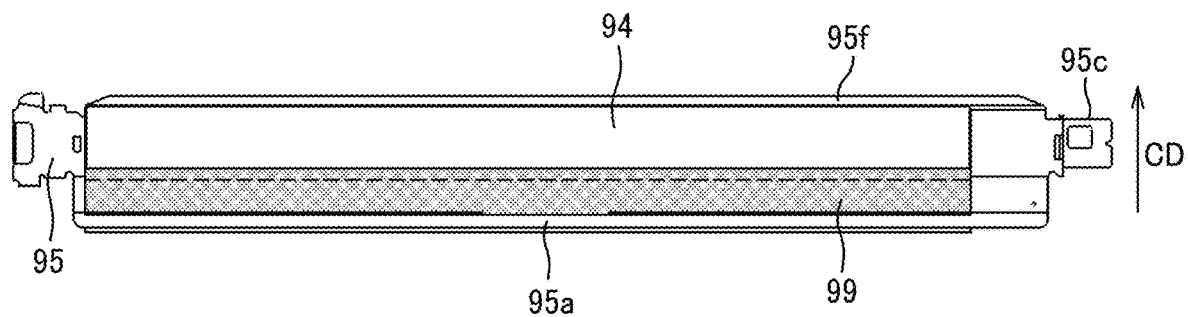

As illustrated in FIGS. 4Aa to 4Ad and FIG. 4Cb, the transparent member holder 95 includes a sheet guide 95a to introduce the medium P to the image reading surface of the transparent member 94 on the upstream side in the medium conveyance direction and a holding portion 95f to hold the transparent member 94. The sheet guide 95a and the holding portion 95f face the medium P being conveyed.

In addition, a cover 99 made of a flexible plastic film such as polyethylene terephthalate (PET) film is attached across the sheet guide 95a and the holding portion 95f at the upstream end of the transparent member 94 as the image reading surface. The cover 99 prevents the leading end of the medium P such as a paper sheet from being caught by the upstream end of the transparent member 94.

The transparent member 94 and the sheet guide 95a are integrated with the transparent member holder 95. Accordingly, even when the transparent member holder 95 is detached from the illumination unit 910 and then reattached, the angle from the sheet guide 95a toward the transparent member 94 does not change. Therefore, the medium P such as a paper sheet can be stably fed to the image reading surface of the transparent member 94.

As illustrated in FIGS. 4B and 4Ca, the illumination unit 910 includes a pair of guides 930 along which the transparent member holder 95 is slidingly inserted and removed in the longitudinal direction thereof (also referred to as the direction perpendicular to the medium conveyance direction). Each side of the transparent member holder 95 in the longitudinal direction is slidably held by the guide 930.

The guide 930 has an L-shaped cross-section and extends in the width direction perpendicular to the medium conveyance direction. The guides 930 regulate the closest position of the transparent member holder 95 to the opposing member 93. Note that the guides 930 do not inhibit the transparent member holder 95 from separating from the opposing member 93 by a position adjuster 913 described later.

The transparent member holder 95 has a pair of engagement holes 95b at one end thereof in the longitudinal direction of the transparent member holder 95 The pair of engagement holes 95b positions the one end, which is on the rear (far) side of the apparatus body 100 in the direction perpendicular to the surface of the paper in which FIGS. 3A and 3B are drawn, with respect to the housing 911 of the illumination unit 910. On the other hand, the housing 911 of the illumination unit 910 includes a first engagement portion 940 including a pair of positioning pins on the rear side of the apparatus body 100, which is the side of the leading end of the transparent member holder 95 in the attachment direction thereof. The pair of positioning pins is inserted into the pair of engagement holes 95b in the longitudinal direction of the transparent member holder 95 to engage the transparent member holder 95. The pair of positioning pins is stationarily secured to the housing 911.

Further, the other end of the transparent member holder 95 illustrated on the right side in FIG. 4Aa, which is on the front (near) side of the apparatus body 100 in the direction perpendicular to the surface of the paper in which FIGS. 3A and 3B are drawn, engages a shaft-shaped second engagement portion 950 described later, and is secured to the position adjuster 913 by a first securing portion 923 that is a fixing screw (see FIG. 4Ac). The second engagement portion 950 is disposed on the front side of the apparatus body 100, which is the side of the leading end of the transparent member holder 95 in the detachment direction thereof. The first securing portion 923 is inserted into an engagement hole 95d disposed in an L-shaped end plate 95c of the transparent member holder 95, and a screw portion at the tip of the first securing portion 923 is screwed into a screw hole 913d disposed in the position adjuster 913. The position adjuster 913 adjusts the position of the transparent member holder 95 with respect to the opposing member 93 in the contact-and-separation direction therebetween.

Then, when the first securing portion 923 is unscrewed and the transparent member holder 95 that holds the transparent member 94 at a predetermined position is slid in the direction indicated by arrow SD illustrated in FIG. 4Ad from the state illustrated in FIG. 4Ab after position adjustment of the transparent member holder 85 by the position adjuster 913 described later, the first engagement portion 940 is disengaged from the engagement holes 95b of the transparent member holder 95. The arrow SD in FIG. 4Ad points toward the front side of the apparatus body 100 in FIG. 3, which is the detachment direction of the transparent member unit and opposite the attachment direction of the transparent member unit.

As the transparent member holder 95 is further slid in the direction indicated arrow SD (rightward in FIG. 4Ad), the transparent member holder 85 is detached from the illumination unit 910. The dirt is wiped off the transparent member 94. Then, the detached transparent member holder 95 is slidingly inserted into the guides 930 of the illumination unit 910 again. The first engagement portion 940 engages the engagement holes 95b at the one end (i.e., the leading end in the attachment direction) of the transparent member holder 95, and the second engagement portion 950 engages an engagement hole 95e at the other end (i.e., the leading end in the detachment direction) of the transparent member holder 95. After that, the first securing portion 923 fastens the transparent member holder 95 to the position adjuster 913.

Such a configuration in which the transparent member holder 95 is pulled out toward the front side of the apparatus body 100 in the direction intersecting the medium conveyance direction facilitates the attachment and detachment of the transparent member holder 95 even when the conveyance gap g is narrow. In addition, since the conveyance gap g is determined when the transparent member holder 95 is secured to the position adjuster 913 that has been adjusted, it is unnecessary to adjust the position of the transparent member holder 95 again, thereby improving the workability of the attachment and detachment of the transparent member holder 95.

The position adjuster 913 is described with reference to FIGS. 4Da, 4Db, and 5. A rotation shaft 920 is inserted into and engages an engagement hole 913a disposed at one end of the position adjuster 913. A screw portion at the tip of the rotation shaft 920 is screwed into a female screw hole 917, which is indicated by a broken line in FIG. 5, disposed in the housing 911 of the illumination unit 910.

An arc-shaped slot hole 913c is disposed at the other end of the position adjuster 913 where a distal end 913b is disposed. A fastening hole 921a is disposed in the housing 911 of the illumination unit 910, which is indicated by a broken line in FIG. 5. A second securing portion 921 having a screw portion, which is indicated by a broken line in FIG. 5, is screwed into the fastening hole 921a to fasten the position adjuster 913 to the housing 911 of the illumination unit 910.

A second engagement portion 950 is disposed at the middle portion of the position adjuster 913 in the longitudinal direction of the position adjuster 913. The second engagement portion 950 is a projection that is inserted into the engagement hole 95e when the transparent member holder 95 is attached to the illumination unit 910. The engagement hole 95e is disposed in the L-shaped end plate 95c of the transparent member holder 95

Figure 5:
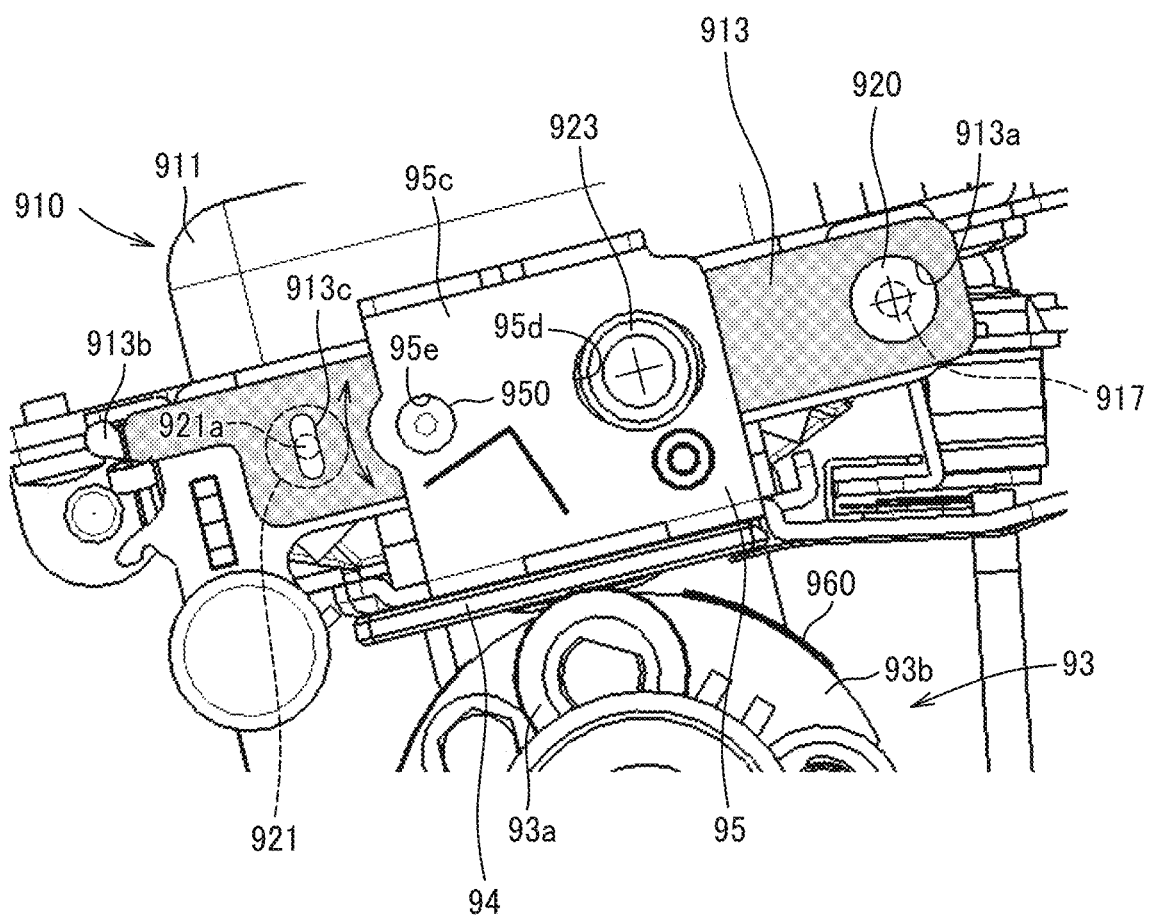
FIG. 5 is a side view of the position adjuster when the transparent member unit is attached.

The position adjuster 913 is swingable around the rotation shaft 920 in a direction indicated by the double-headed arrow in FIG. 5. When the second securing portion 921 is unscrewed and the distal end 913b of the position adjuster 913 is swung upward in FIG. 5, the transparent member holder 95 moves in the direction away from the opposing member 93. At this time, the position of the screw hole 913d for securing the transparent member holder 95 also moves in the direction away from the opposing member 93.

Figure 4D:
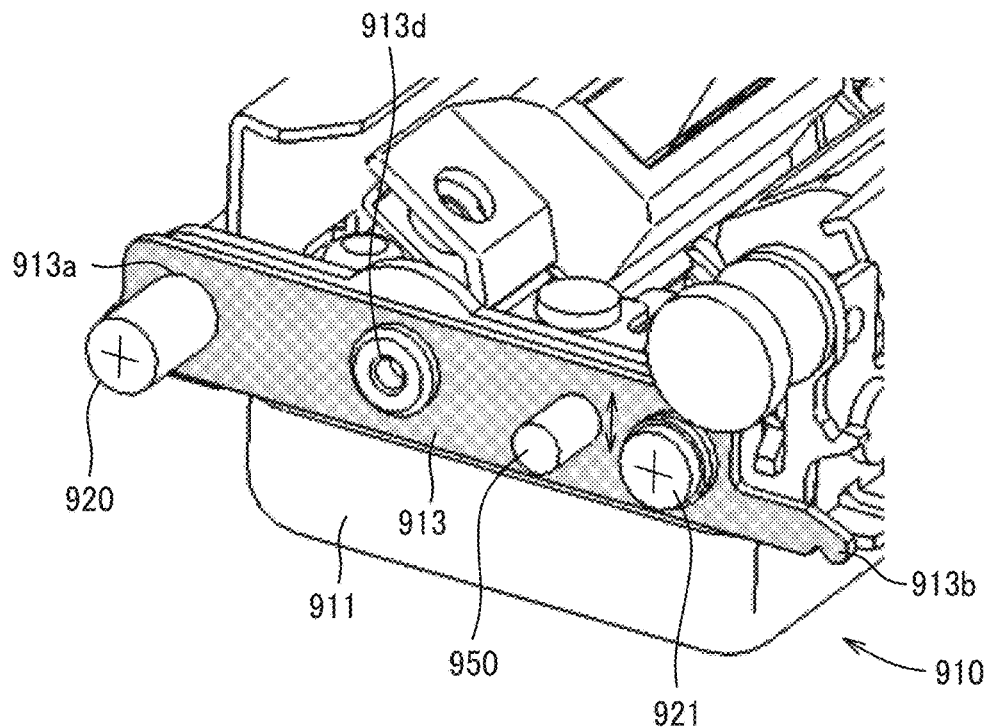
FIG. 4Da is a perspective view of a position adjuster, which adjusts the position of the transparent member unit, when the transparent member unit is detached.
Figure 4D:
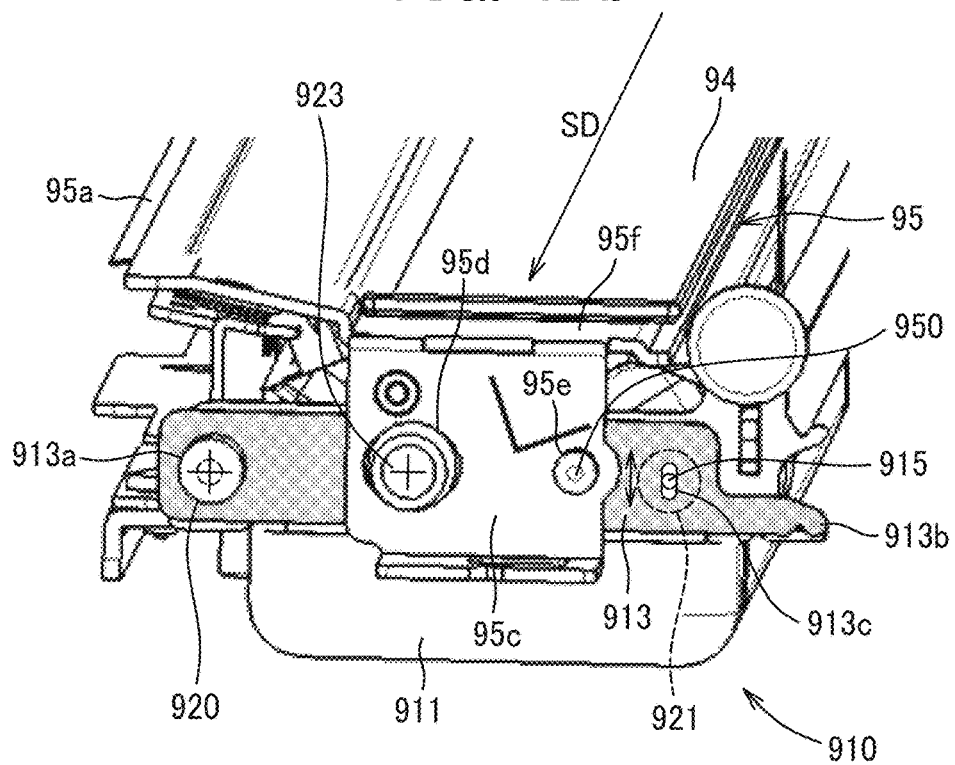

When the position adjuster 913 is swung and reaches a proper position of the transparent member holder 95 at which the conveyance gap g is properly secured, the second securing portion 921 fastens the position adjuster 913, thereby determining the position of the transparent member holder 95 (see FIG. 4Da). After the position is determined, since the position adjuster 913 is firmly secured to the housing 911, even if the transparent member holder 95 is detached, the transparent member holder 95 can be secured to the position adjuster 913 so that the conveyance gap g is properly secured when the transparent member holder 95 is reattached.

Alternatively, the first engagement portion 940 that engages the engagement holes 95b of the transparent member holder 95, which is disposed on the left side in FIG. 4Aa, may be attached to another position adjuster whose position can be changed with respect to the housing 911. This position adjuster may include a rotation shaft with respect to the housing 911 and a securing portion to secure the position adjuster to the housing 911, similarly to the position adjuster 913. After the position is determined by the position adjuster, the image reading device 9 can be mounted to the apparatus body 100.

Figure 6A:
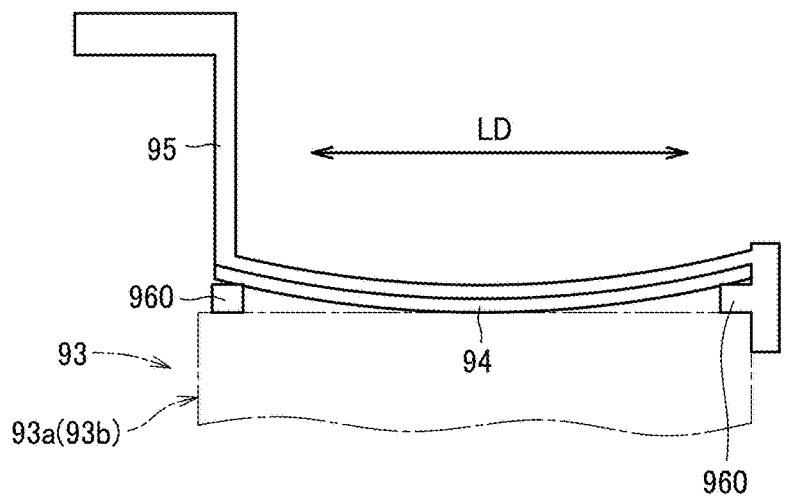
FIG. 6A is a schematic view of the transparent member unit when the transparent member unit is bent under gravity, in which the change in shape is emphasized.
Figure 6B:
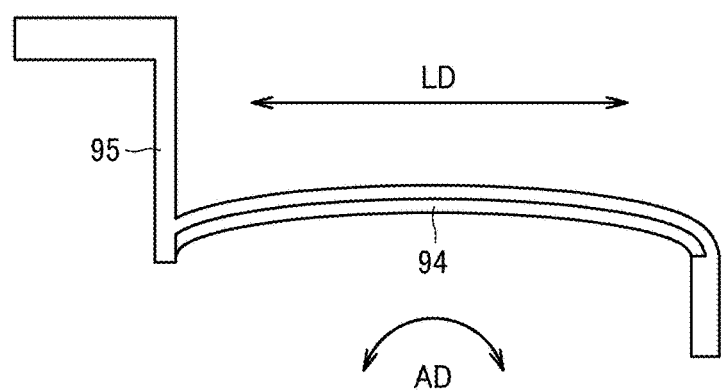
FIG. 6B is a schematic view of the transparent member unit that is bent upward in order to cancel the bending under gravity.
Figure 6C:
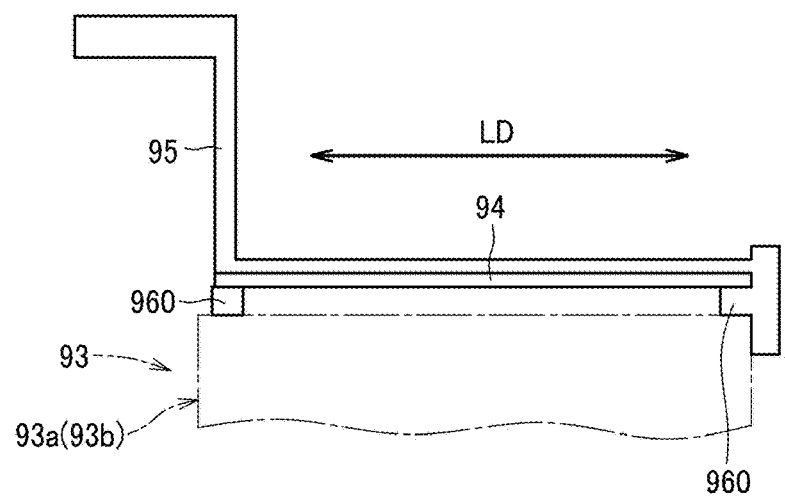
FIG. 6C is a schematic view of the transparent member unit whose own weight corrects the upward bending to a straight line.

When the position of the transparent member holder 95 is adjusted by the position adjuster 913 illustrated in FIG. 5, conveyance gap adjusters 960 illustrated in FIGS. 6A and 6C are used. After the conveyance gap g is determined by the conveyance gap adjusters 960, the position of the position adjuster 913 is secured.

Since the transparent member 94 and the transparent member holder 95 are elongated, the center portion thereof is bent in a downward convex arc-shape in the longitudinal direction thereof indicated by arrow LD in FIG. 6A under gravity. Therefore, even if the thickness of the conveyance gap adjusters 960 illustrated in FIG. 6A is adjusted to the conveyance gap g to be set, the conveyance gap g at the center portion becomes narrow due to the arc-shaped bending. Therefore, the transparent member 94 and the medium P may interfere with each other, or the medium P may be jammed in the conveyance gap g.

Therefore, in the present embodiment, the transparent member 94 and the transparent member holder 95 are preliminarily formed in an upward convex arc-shape in a natural state as indicated by arrow AD in FIG. 6B. Thus, the weight of the transparent member 94 and the transparent member holder 95 can cancel the downward convex arc-shaped bending illustrated in FIG. 6A, and the transparent member 94 and the transparent member holder 95 can keep the shape extending in a horizontal straight line in the longitudinal direction indicated by arrow LD in FIG. 6C.

In the state illustrated in FIG. 6C, the conveyance gap adjusters 960 are interposed between the transparent member 94 and the opposing member 93. Then, the transparent member 94 is moved closer to the opposing member 93 until both ends of the transparent member 94 contact the conveyance gap adjusters 960. As the position adjuster 913 is swung downward in FIG. 5, the transparent member 94 approaches the opposing member 93. After that, the second securing portion 921 illustrated in FIG. 5 is tightened to determine the position of the position adjuster 913. After the position of the position adjuster 913 is secured, the conveyance gap adjusters 960 are removed. As a result, the conveyance gap g can be uniform in the width direction of the medium conveyance path T, thereby preventing the medium P from interfering with the transparent member 94 and from being jammed in the conveyance gap g.

FIGS. 7A and 7B illustrate another embodiment of the position adjuster 913. In the above-described embodiment, the position adjuster 913 is swung to determine the position of the transparent member holder 95. The present embodiment is different in that the entire position adjuster 913 is moved up and down.

As illustrated in FIGS. 7A and 7B, slot holes 913g and 913h extending in the vertical direction are disposed at both left and right ends of the position adjuster 913. The screw portions at the tips of a pair of second securing portions 921 and 924 are screwed into female screw holes 915 and 917 of the housing 911 through the slot holes 913g and 913h, respectively.

The position adjuster 913 includes a protruding portion 913e protruding upward from the middle portion thereof. A slot hole 913f that engages an engagement pin 971 of an eccentric cam 970 is disposed in the protruding portion 913e.

As illustrated in FIG. 7A, when the eccentric cam 970 rotates in a state in which the second securing portions 921 and 924 are detached or loosened, the entire position adjuster 913 moves vertically, which is substantially parallel movement. When the position adjuster 913 reaches a predetermined position corresponding to the conveyance gap g, the second securing portions 921 and 924 are tightened as illustrated in FIG. 7B to secure the position of the position adjuster 913.

Although the preferred embodiments of the present disclosure have been described above, the present disclosure is not limited to the embodiments described above, and a variety of modifications can naturally be made within the scope of the present disclosure. For example, a position adjuster having a wedge-shape that moves horizontally may be used, instead of the position adjuster 913 that is swingable or the eccentric cam 970 that is rotatable. In the above-described embodiments, the other end of the transparent member holder 95 is lifted by the position adjuster 913. Alternatively, both ends of the transparent member holder 95 can be lifted to separate the transparent member holder 95 from the opposing member 93. The image forming apparatus is not limited to the electrophotographic type, an inkjet type image forming apparatus in which liquid is applied from a recording head to form an image may be used.

As described above, according to the present disclosure, the transparent member can be detachably attached to the apparatus body, and the position adjustment work when the transparent member is reattached can be simplified.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. An image reading device comprising:
   a transparent member unit including a transparent member;
   an opposing member opposed to the transparent member; and
   a reading mechanism configured to irradiate the opposing member and a medium being conveyed between the transparent member and the opposing member with light through the transparent member and to receive reflected light from the opposing member and the medium, the reading mechanism includes:
   a position adjuster to which the transparent member unit is secured, the position adjuster configured to change a position at which the transparent member unit is secured with respect to the reading mechanism; and a guide configured to guide the transparent member unit in a direction intersecting a direction of conveyance of the medium to detachably attach the transparent member unit to the reading mechanism.

2. The image reading device according to claim 1, wherein the reading mechanism further includes an engagement portion configured to engage with a leading end of the transparent member unit in an attachment direction of the transparent member unit.

3. The image reading device according to claim 1, wherein the position adjuster includes:

an engagement portion configured to engage with a leading end of the transparent member unit in a detachment direction of the transparent member unit; and a securing portion configured to secure the transparent member unit to the position adjuster.

4. The image reading device according to claim 1, wherein the position adjuster includes:

a rotation shaft around which the position adjuster is rotatable; and a securing portion configured to secure the position adjuster to the reading mechanism.

5. The image reading device according to claim 1, wherein the transparent member unit further includes:

a transparent member holder including a holding portion configured to hold the transparent member; and a sheet guide configured to guide the medium being conveyed.

6. The image reading device according to claim 5, wherein the transparent member unit further includes a cover across the holding portion and the sheet guide, and wherein the holding portion and the sheet guide is opposed to the medium being conveyed.

7. A medium conveyance device comprising:

a conveyance roller pair configured to convey a medium; and the image reading device according to claim 1.

8. An image forming apparatus comprising:

an image forming device configured to form an image on a medium; and the image reading device according to claim 1.

* * * * *